United States Patent
Patel et al.

(10) Patent No.: US 12,018,935 B2
(45) Date of Patent: Jun. 25, 2024

(54) SYSTEMS AND METHODS FOR ESTIMATING TACTILE OUTPUT BASED ON DEPTH DATA

(71) Applicant: Honda Motor Co., Ltd., Tokyo (JP)

(72) Inventors: Karankumar Patel, Sunnyvale, CA (US); Soshi Iba, Mountain View, CA (US); Nawid Jamali, Dublin, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 952 days.

(21) Appl. No.: 17/024,003

(22) Filed: Sep. 17, 2020

(65) Prior Publication Data

US 2021/0270605 A1 Sep. 2, 2021

Related U.S. Application Data (60) Provisional application No. 62/982,269, filed on Feb. 27, 2020.

(51) Int. Cl.

| | |
|---|---|
| *G01B 21/18* | (2006.01) |
| *B25J 13/08* | (2006.01) |
| *G01B 21/30* | (2006.01) |
| *G01L 5/00* | (2006.01) |
| *G06T 7/40* | (2017.01) |
| *G06T 7/50* | (2017.01) |

(52) U.S. Cl.
CPC ........... *G01B 21/18* (2013.01); *B25J 13/084* (2013.01); *G01B 21/30* (2013.01); *G01L 5/0061* (2013.01); *G06T 7/40* (2013.01); *G06T 7/50* (2017.01); *G06T 2207/20081* (2013.01); *G06T 2207/20084* (2013.01)

(58) Field of Classification Search
CPC ...................................................... G01B 21/18
See application file for complete search history.

(56) References Cited

U.S. PATENT DOCUMENTS

2020/0215685 A1\* 7/2020 Jamali .................... B25J 9/1697

OTHER PUBLICATIONS

M. Bauza, O. Canal, and A. Rodriguez, "Tactile mapping and localization from high-resolution tactile imprints," in 2019 International Conference on Robotics and Automation (ICRA). IEEE, 2019, pp. 3811-3817.

(Continued)

*Primary Examiner* — Walter L Lindsay, Jr.
*Assistant Examiner* — Andrew V Do
(74) *Attorney, Agent, or Firm* — RANKIN, HILL & CLARK LLP (57) ABSTRACT

Systems and methods for tactile output estimation are provided. In one embodiment, the system includes a depth map module, an estimation module, and a surface module. The depth map module is configured to identify a region of interest (RoI) of an object. The area of the RoI corresponds to a tactile sensor size of a tactile sensor. The depth module is further configured to receive depth data for the RoI from a depth sensor and generate a depth map for the RoI based on a volume of the depth data relative to a frame of reference of the RoI. The estimation module is configured to estimate a tactile sensor output based on the depth map. The surface module configured to determine surface properties based on the estimated tactile sensor output.

14 Claims, 7 Drawing Sheets

(56) References Cited

OTHER PUBLICATIONS

P. J. Besl and N. D. McKay, "Method for registration of 3-d shapes," in Sensor fusion IV: control paradigms and data structures, vol. 1611. International Society for Optics and Photonics, 1992, pp. 586-606.

J. Bohg, A. Morales, T. Asfour, and D. Kragic, "Data-driven grasp synthesis—a survey," IEEE Transactions on Robotics, vol. 30, No. 2, pp. 289-309, 2013.

R. Calandra, A. Owens, D. Jayaraman, J. Lin, W. Yuan, J. Malik, E. H. Adelson, and S. Levine, "More than a feeling: Learning to grasp and regrasp using vision and touch," IEEE Robotics and Automation Letters, vol. 3, No. 4, pp. 3300-3307, 2018.

B. Calli, A. Walsman, A. Singh, S. Srinivasa, P. Abbeel, and A. M. Dollar, "Benchmarking in manipulation research: Using the yale-cmu-berkeley object and model set," IEEE Robotics & Automation Magazine, vol. 22, No. 3, pp. 36-52, 2015.

J. A. Fishel and G. E. Loeb, "Bayesian exploration for intelligent identification of textures," Frontiers in neurorobotics, vol. 6, p. 4, 2012.

R. W. Fleming, "Visual perception of materials and their properties," Vision research, vol. 94, pp. 62-75, 2014.

J. R. Flynn, S. Ward, J. Abich, and D. Poole, "Image quality assessment using the ssim and the just noticeable difference paradigm," in International Conference on Engineering Psychology and Cognitive Ergonomics. Springer, 2013.

I. Fujimoto, Y. Yamada, T. Morizono, Y. Umetani, and T. Maeno, "Development of artificial finger skin to detect incipient slip for realization of static friction sensation," in Proceedings of IEEE International Conference on Multisensor Fusion and Integration for Intelligent Systems, MFI2003. IEEE, 2003, pp. 15-20.

I. Goodfellow, J. Pouget-Abadie, M. Mirza, B. Xu, D. Warde-Farley, S. Ozair, A. Courville, and Y. Bengio, "Generative adversarial nets," in Advances in neural information processing systems, 2014, pp. 2672-2680.

G. Hellard and R. A. Russell, "A robust, sensitive and economical tactile sensor for a robotic manipulator," in Australian Conference on Robotics and Automation. Citeseer, 2002, pp. 100-104.

F. R. Hogan, M. Bauza, O. Canal, E. Donlon, and A. Rodriguez, "Tactile regrasp: Grasp adjustments via simulated tactile transformations," in 2018 IEEE/RSJ International Conference on Intelligent Robots and Systems (IROS). IEEE, 2018, pp. 2963-2970.

S. Ioffe and C. Szegedy, "Batch normalization: Accelerating deep network training by reducing internal covariate shift," arXiv preprint arXiv:1502.03167, 2015.

P. Isola, J.-Y. Zhu, T. Zhou, and A. A. Efros, "Image-to-image translation with conditional adversarial networks," in Proceedings of the IEEE conference on computer vision and pattern recognition, 2017, pp. 1125-1134.

N. Jamali, M. Maggiali, F. Giovannini, G. Metta, and L. Natale, "A new design of a fingertip for the icub hand," in 2015 IEEE/RSJ International Conference on Intelligent Robots and Systems (IROS). IEEE, 2015, pp. 2705-2710.

N. Jamali and C. Sammut, "Slip prediction using hidden markov models: Multidimensional sensor data to symbolic temporal pattern learning," in 2012 IEEE International Conference on Robotics and Automation. IEEE, 2012, pp. 215-222.

N. Jamili and C. Sammut, "Majority voting: Material classification by tactile sensing using surface texture," IEEE Transactions on Robotics, vol. 27, No. 3, pp. 508-521, 2011.

M. K. Johnson and E. H. Adelson, "Retrographic sensing for the measurement of surface texture and shape," in 2009 IEEE Conference on Computer Vision and Pattern Recognition. IEEE, 2009, pp. 1070-1077.

O. Kerpa, K. Weiss, and H. Worn, "Development of a flexible tactile sensor system for a humanoid robot," in Proceedings 2003 IEEE/RSJ International Conference on Intelligent Robots and Systems (IROS 2003)(Cat. No. 03CH37453), vol. 1. IEEE, 2003, pp. 1-6.

J. K. Kim, J. W. Wee, and C. H. Lee, "Sensor fusion system for improving the recognition of 3d object," in IEEE Conference on Cybernetics and Intelligent Systems, 2004., vol. 2. IEEE, 2004, pp. 1207-1212.

D. P. Kingma and J. Ba, "Adam: A method for stochastic optimization," arXiv preprint arXiv:1412.6980, 2014.

C. Li and M. Wand, "Precomputed real-time texture synthesis with markovian generative adversarial networks," in European conference on computer vision. Springer, 2016, pp. 702-716.

Y. Li, J.-Y. Zhu, R. Tedrake, and A. Torralba, "Connecting touch and vision via cross-modal prediction," in Proceedings of the IEEE Conference on Computer Vision and Pattern Recognition, 2019.

J. Mahler, M. Matl, V. Satish, M. Danielczuk, B. DeRose, S. McKinley, and K. Goldberg, "Learning ambidextrous robot grasping policies," Science Robotics, vol. 4, No. 26, p. eaau4984, 2019.

M. Mirza and S. Osindero, "Conditional generative adversarial nets. arxiv 2014," arXiv preprint arXiv:1411.1784, 2014.

M. Ohka, Y. Mitsuya, Y. Matsunaga, and S. Takeuchi, "Sensing characteristics of an optical three-axis tactile sensor under combined loading," Robotica, vol. 22, No. 2, pp. 213-221, 2004.

O. Ronneberger, P. Fischer, and T. Brox, "U-net: Convolutional networks for biomedical image segmentation," in International Conference on Medical image computing and computer-assisted intervention. Springer, 2015, pp. 234-241.

R. B. Rusu, "Semantic 3d object maps for everyday manipulation in human living environments," KI-Künstliche Intelligenz, vol. 24, No. 4, pp. 345-348, 2010.

R. B. Rusu, N. Blodow, and M. Beetz, "Fast point feature histograms (fpfh) for 3d registration," in 2009 IEEE international conference on robotics and automation. IEEE, 2009, pp. 3212-3217.

Y. Tada, K. Hosoda, and M. Asada, "Sensing ability of anthropomorphic fingertip with multi-modal sensors," in IEEE International Conference on Intelligent Robots and Systems. Citeseer, 2004, pp. 1005-1012.

D. Taddeucci, C. Laschi, R. Lazzarini, R. Magni, P. Dario, and A. Starita, "An approach to integrated tactile perception," in Proceedings of International Conference on Robotics and Automation, vol. 4. IEEE, 1997, pp. 3100-3105.

K. Takahashi and J. Tan, "Deep visuo-tactile learning: Estimation of tactile properties from images," in 2019 International Conference on Robotics and Automation (ICRA). IEEE, 2019, pp. 8951-8957.

M. Tanaka and T. Horiuchi, "Investigating perceptual qualities of static surface appearance using real materials and displayed images," Vision research, vol. 115, pp. 246-258, 2015.

Y. Tanaka, M. Tanaka, and S. Chonan, "Development of a sensor system for collecting tactile information," Microsystem Technologies, vol. 13, No. 8-10, pp. 1005-1013, 2007.

W. M. B. Tiest, "Tactual perception of material properties," Vision research, vol. 50, No. 24, pp. 2775-2782, 2010.

E. Torres-Jara, I. Vasilescu, and R. Coral, "A soft touch: Compliant tactile sensors for sensitive manipulation," 2006.

P. Wacker, C. Wacharamanotham, D. Spelmezan, J. Thar, D. A. Sanchez, R. Bohne, and J. Borchers, "Vibrovision: an on-body tactile image guide for the blind," in Proceedings of the 2016 CHI Conference Extended Abstracts on Human Factors in Computing Systems, 2016.

Z. Wang, A. C. Bovik, H. R. Sheikh, and E. P. Simoncelli, "Image quality assessment: from error visibility to structural similarity," IEEE transactions on image processing, vol. 13, No. 4, pp. 600-612, 2004.

N. Wettels, J. A. Fishel, and G. E. Loeb, "Multimodal tactile sensor," in the Human Hand as an Inspiration for Robot Hand Development. Springer, 2014, pp. 405-429.

H. Yanagisawa and K. Takatsuji, "Effects of visual expectation on perceived tactile perception: An evaluation method of surface texture with expectation effect," International Journal of Design, vol. 9, No. 1, 2015.

W. Yuan, S. Dong, and E. H. Adelson, "Gelsight: High-resolution robot tactile sensors for estimating geometry and force," Sensors, 2017.

* cited by examiner

```
┌─────────────────────────────────────┐ 302
│ Identify a region of interest (RoI) of an object │
└─────────────────────────────────────┘
                    ↓
┌─────────────────────────────────────┐ 304
│      Receive depth data for the RoI      │
└─────────────────────────────────────┘
                    ↓
┌─────────────────────────────────────┐ 306
│      Generate a depth map for the RoI    │
│           based on the depth data        │
└─────────────────────────────────────┘
                    ↓
┌─────────────────────────────────────┐ 308
│       Estimate a tactile sensor output   │
│            based on the depth map        │
└─────────────────────────────────────┘
                    ↓
┌─────────────────────────────────────┐ 310
│     Determine surface properties based   │
│    on the estimated tactile sensor output │
└─────────────────────────────────────┘
```

SYSTEMS AND METHODS FOR ESTIMATING TACTILE OUTPUT BASED ON DEPTH DATA

BACKGROUND

Perception of object properties such as texture, roughness and slipperiness may help an agent to make contact with objects in their environment. Humans may use touch to perceive contact properties. With sufficient experience, however, humans may also be able to perceive such properties from visual perception alone, albeit, a rough qualitative estimate of a certain physical property, for example, the object surface appears to be smooth and slippery. This visual assessment may help a human determine how best to interact with an object in the environment. Similarly, estimates of contact properties of an object such as roughness and slipperiness may also help an agent in deciding how to interact with the object in advance without making contact with the object.

BRIEF DESCRIPTION

According to one embodiment, a system for estimating tactile output based on depth sensor data is provided. The system includes a depth map module, an estimation module, and a surface module. The depth map module is configured to identify a region of interest (RoI) of an object. The area of the RoI may correspond to a tactile sensor size of a tactile sensor. The depth module is further configured to receive depth data for the RoI from a depth sensor and generate a depth map for the RoI based on a volume of the depth data relative to a frame of reference of the RoI. The estimation module is configured to estimate a tactile sensor output based on the depth map. The surface module is configured to determine surface properties based on the estimated tactile sensor output.

According to another embodiment, a method for estimating tactile output based on depth sensor data is provided. The method includes identifying a region of interest (RoI) of an object. The area of the RoI corresponds to a tactile sensor size of a tactile sensor. The method also includes receiving depth data for the RoI from a depth sensor. A depth map is generated for the RoI based on a volume of the depth data relative to a frame of reference of the RoI. The method yet further includes estimating a tactile sensor output based on the depth map. Surface properties are determined based on the estimated tactile sensor output.

According to yet another embodiment, a non-transitory computer readable storage medium storing instructions that, when executed by a computer having a processor, cause the computer to perform a method for estimating tactile output based on depth sensor data. The method includes identifying a region of interest (RoI) of an object. The area of the RoI corresponds to a tactile sensor size of a tactile sensor. The method also includes receiving depth data for the RoI from a depth sensor. A depth map is generated for the RoI based on a volume of the depth data relative to a frame of reference of the RoI. The method yet further includes estimating a tactile sensor output based on the depth map. Surface properties are determined based on the estimated tactile sensor output.

DETAILED DESCRIPTION

The systems and methods herein for estimating tactile output based on depth data give an agent the ability to assess tactile properties of an object without making contact. For example, to successfully grasp an object, often, an agent may make multiple contacts with an object to determine a suitable contact location for stable grasp. These grasping operations may include multiple contact attempts to generate the tactile data which may be time consuming and inefficient for the agent and may also cause damage to the object.

Here, the systems and methods may use depth data of the surface of an object to estimate the tactile output, which, in turn, may be used by a computing device to estimate physical properties of the object. In one embodiment, the system may include a depth sensor to sense the structure of the surface of a region of interest (RoI) of the object. The depth data from the depth sensor in the RoI may be used as the input of a neural network. In some embodiments, the area of the RoI corresponds to the area of the surface of a tactile sensor. The neural network may estimate what output of the tactile sensors would have produced if a contact with the object were to be established. The estimate of the output of the tactile sensors may increase the efficiency of the agent and help the agent to affect a physical change to the object, such as gracefully manipulating objects in their environment.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a self-propelled machine that moves through or manipulates an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area Network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more users. Further, the term "vehicle" may include vehicles that are automated or non-automated with pre-determined paths or free-moving vehicles.

I. System Overview

Figure 1:
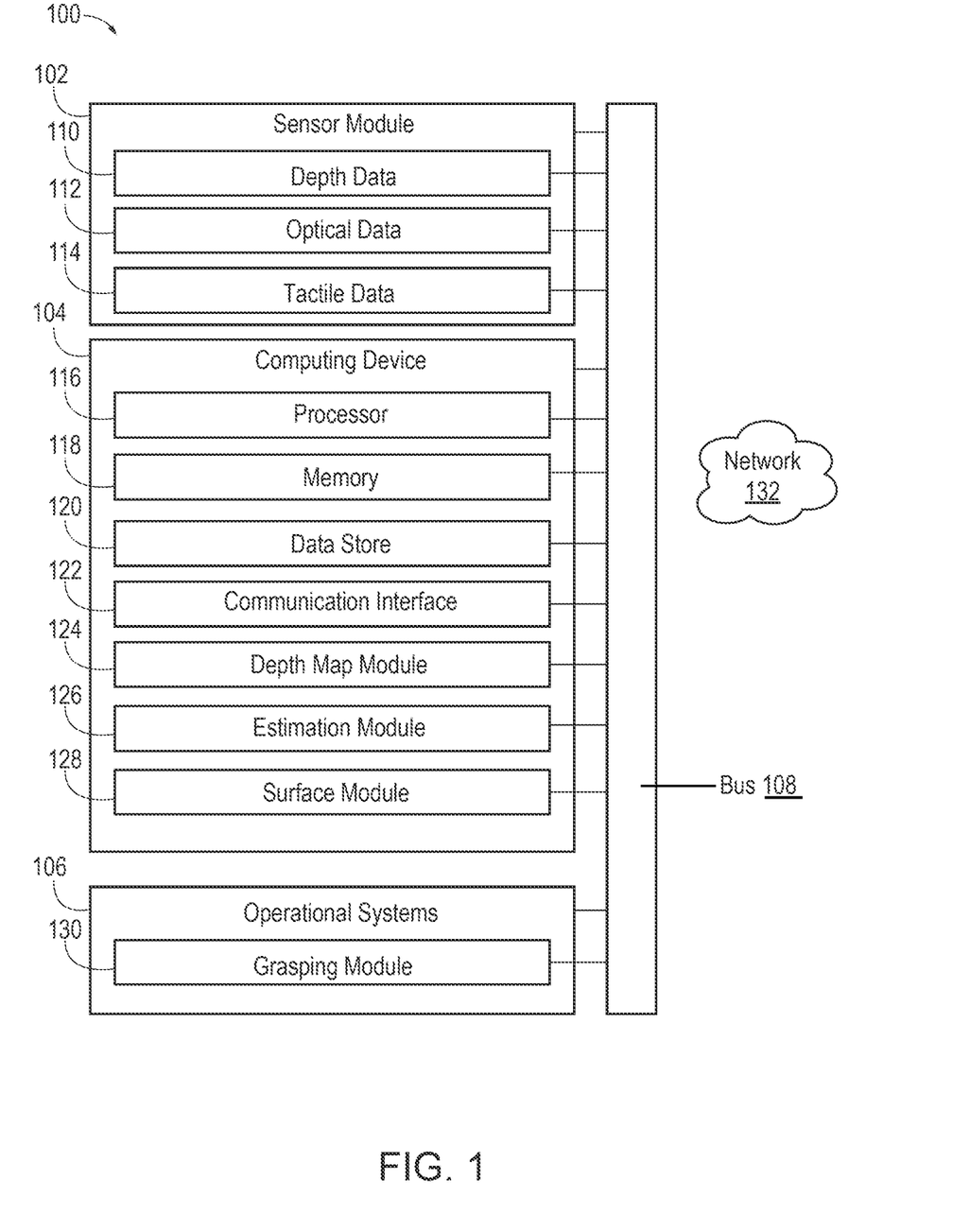
FIG. 1 is an exemplary component diagram of a system for estimating tactile output based on depth data, according to one aspect.

The drawings are for purposes of illustrating one or more exemplary embodiments and not for purposes of limiting the same. FIG. 1 is an exemplary component diagram of an operating environment 100 for estimating tactile sensor output, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 7:
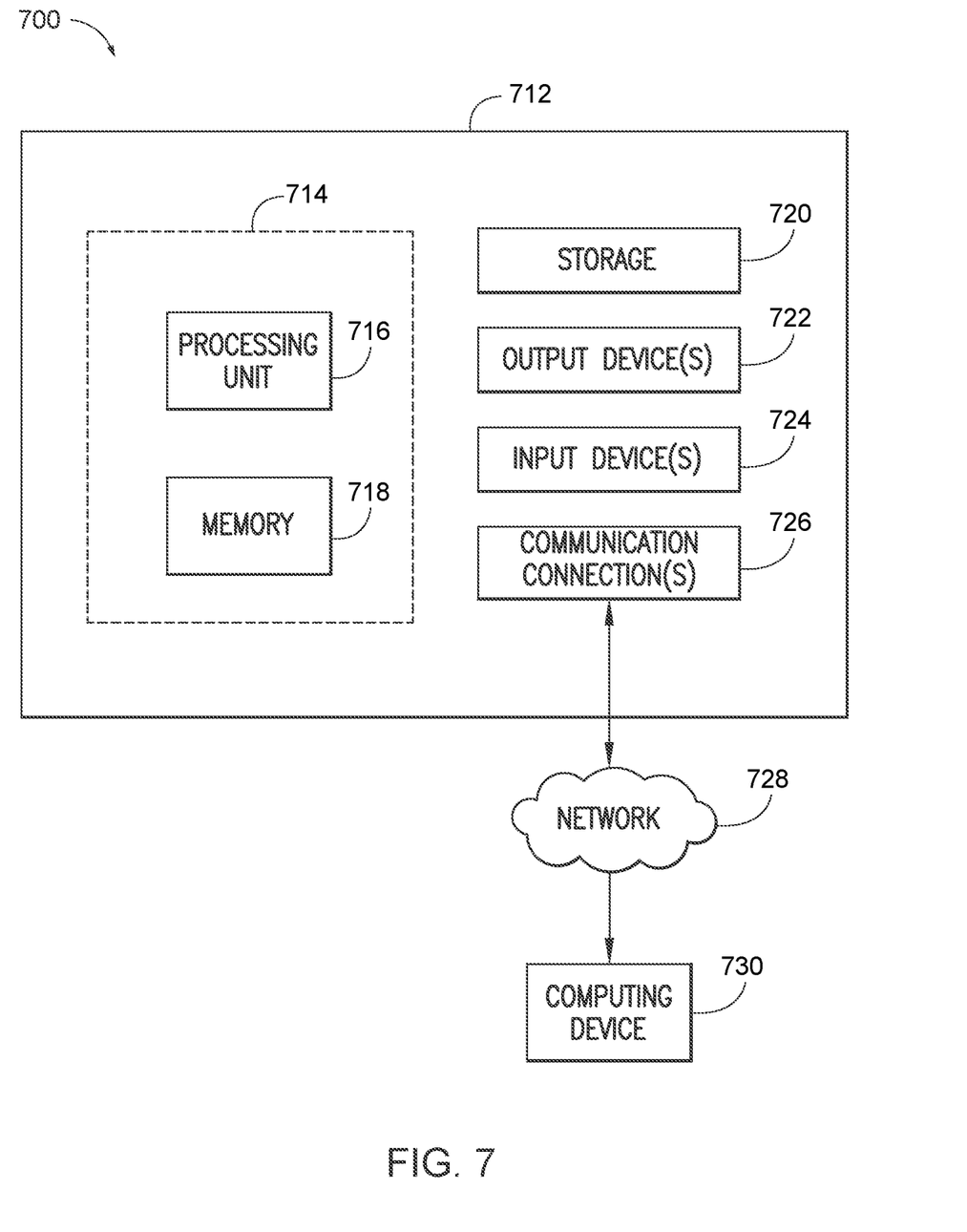
FIG. 7 is an illustration of an example computing environment where one or more of the provisions set forth herein are implemented, according to one aspect.

The computing device may be implemented as a part of an agent. The agent may be bipedal, two-wheeled, four-wheeled robot, vehicle, or self-propelled machine. The autonomous ego agent may be configured as a humanoid robot. The humanoid robot may take the form of all or a portion of a robot. For example, the humanoid robot may take the form of an arm coupled to a hand with fingers. The computing device 104 may be implemented as part of a telematics unit, a head unit, a navigation unit, an infotainment unit, an electronic control unit, among others of an ego agent. In other embodiments, the components and functions of the computing device 104 may be implemented, for example, with other devices 730 (e.g., a portable device) or another device connected via a network (e.g., a network 132). The computing device 104 may be capable of providing wired or wireless computer communications utilizing various protocols to send/receive electronic signals internally to/from components of the operating environment 100. Additionally, the computing device 104 may be operably connected for internal computer communications via the bus 108 (e.g., a Controller Area Network (CAN) or a Local Interconnect Network (LIN) protocol bus) to facilitate data input and output between the computing device 104 and the components of the operating environment 100.

Figure 2:
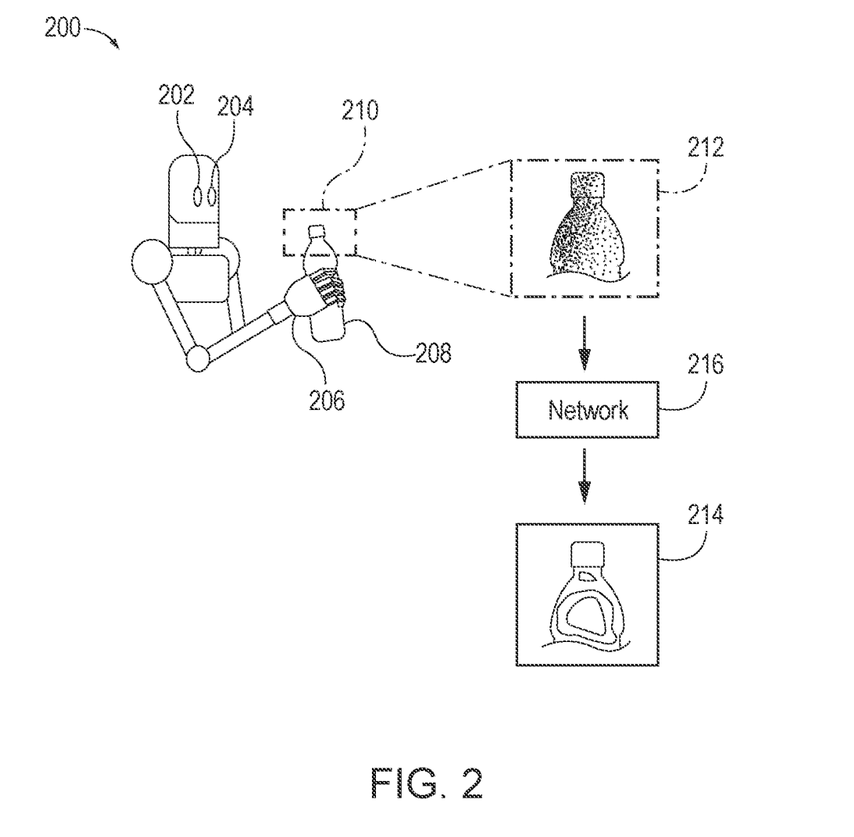
FIG. 2 is an exemplary process flow of a method for estimating tactile output based on depth data, according to one aspect.

In some embodiments, the ego agent may be the agent 200 shown in FIG. 2. The ego agent 200 has a number of sensors. For example, the agent 200 including, but not limited to, a depth sensor 202, an image sensor 204, and a force sensor 206. The depth sensor 202, the image sensor 204, and the force sensor 206 receive data from an environment of an object 208. The sensor module 102 receives, provides, and/or senses information associated with the agent 200, an object 208, the operating environment 100, an environment of the agent 200, and/or the operational systems 106. In one embodiment, the sensor module 102 receives depth data 110, optical data 112, and tactile data 114 from the sensors. For example, the sensor module 102 may receive depth data 110 from the depth sensor 202, optical data 112 from the image sensor 204, and the tactile data 114 from the force sensor 206. The computing device 104 receives the depth data 110, the optical data 112, and the tactile data 114 from the sensor module 102.

Accordingly, the sensors 202-206 and/or the sensor module 102 are operable to sense a measurement of data associated with the agent 200, the operating environment 100, the object 208, the environment, and/or the operational systems 106 and generate a data signal indicating said measurement of data. These data signals may be converted into other data formats (e.g., numerical) and/or used by the sensor module 102, the computing device 104, and/or the operational systems 106 to generate other data metrics and parameters. It is understood that the sensors may be any type of sensor, for example, acoustic, electric, environmental, optical, imaging, light, pressure, force, thermal, temperature, proximity, gyroscope, and accelerometers, among others. Furthermore, a single sensor, such as the depth sensor 202 may be described, that includes multiple sensors and/or sensing components.

The computing device 104 includes a processor 116, a memory 118, a data store 120, and a communication interface 122, which are each operably connected for computer communication via a bus 108 and/or other wired and wireless technologies. The communication interface 122 provides software and hardware to facilitate data input and output between the components of the computing device 104 and other components, networks, and data sources, which will be described herein. Additionally, the computing device 104 also includes a depth map module 124, an estimation module 126, and a surface module 128, for estimating tactile sensor output facilitated by the components of the operating environment 100.

The depth map, the estimation module 126, and/or the surface module 128 may be an artificial neural network that acts as a framework for machine learning, including deep learning. For example, the depth map module 124, the estimation module 126, and/or the surface module 128 may be a convolution neural network (CNN). In one embodiment, the depth map module 124 and/or the estimation module 126 may include a conditional generative adversarial network (cGAN). The estimation module 126 and/or the surface module 128 may include an input layer, an output layer, and one or more hidden layers, which may be convolutional filters.

The computing device 104 is also operably connected for computer communication (e.g., via the bus 108 and/or the communication interface 122) to one or more operational systems 106. The operational systems 106 may include, but are not limited to, any automatic or manual systems that may be used to enhance the agent, operation, and/or safety. The operational systems 106 may be dependent on the implementation. For example, the operational system may include a grasping module 130. The grasping module 130 monitors, analyzes, and operates the agent 200 to some degree. As an example, the grasping module 130 monitors, analyzes, and calculates grasp information and facilitates features like a determination of how to hold the object 208, an assessment of the surface properties of the object 208, a calculation of the force needed to hold the object 208, etc.

The operational systems 106 also include and/or are operably connected for computer communication to the sensor module 102. For example, one or more sensors of the sensor module 102 may be incorporated with the grasping module 130 to monitor characteristics of the environment or the agent.

The sensor module 102, the computing device 104, and/or the operational systems 106 are also operatively connected for computer communication to the network 132. The network 132 is, for example, a data network, the Internet, a wide area network (WAN) or a local area (LAN) network. The network 132 serves as a communication medium to various remote devices (e.g., databases, web servers, remote servers, application servers, intermediary servers, client machines, other portable devices). Using the system and network configuration discussed above, anomalous events may be detected. Detailed embodiments describing exemplary methods using the system and network configuration discussed above will now be discussed in detail.

II. Methods for Tactile Sensor Output Estimation

Figure 3:
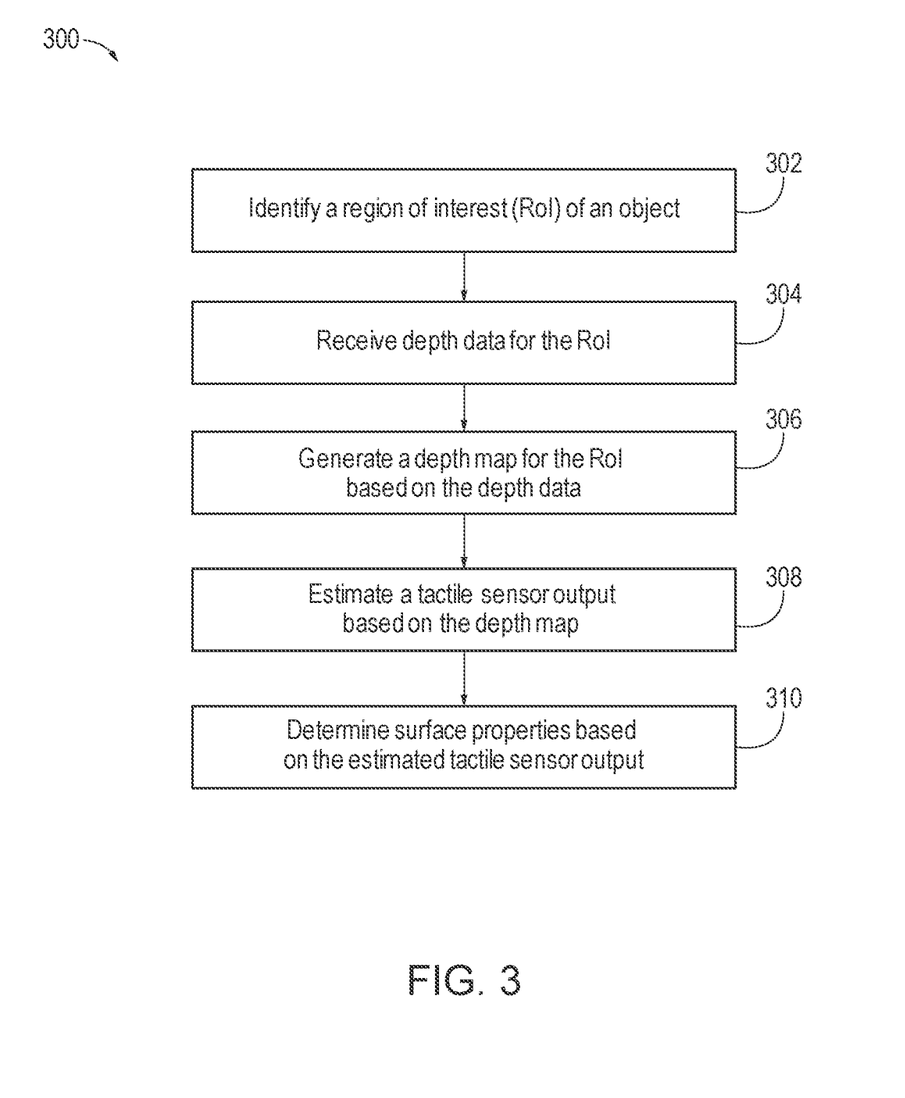
FIG. 3 is an exemplary agent environment of a system for estimating tactile output based on depth data, according to one aspect.

Referring now to FIG. 3, a method 300 for a tactile sensor output estimation will now be described according to an exemplary embodiment. FIG. 3 will also be described with reference to FIGS. 1, 2, and 4-7. For simplicity, the method 300 will be described as a sequence of elements, but it is understood that the elements of the method 300 may be organized into different architectures, blocks, stages, and/or processes.

At block 302, the method 300 includes the depth map module 124 identifying a region of interest (RoI) of an object. The RoI may be an area of the object 208 corresponding to a tactile sensor size of a force sensor 206. For example, the RoI may be a portion of the object that the agent has identified as a candidate position from which the object 208 may be grabbed. The RoI may also may be identified as an area larger than the tactile sensor size to account for any sensor errors. In one embodiment, the depth data 110 may be provided to an object segmentation neural network to determine the RoI of the object 208. In some embodiments, the RoI may be used to remove extraneous objects that are not of interest to streamline data processing. The RoI may also be used to focus on a specific portion of the object 208 or classify the object 208 by type. Object classification may facilitate registering the depth data 110 with optical data 112 and/or the tactile data 114.

At block 304, the method 300 includes the depth map module 124 receiving depth data 110 that may be received from the depth sensor 202 via the sensor module 102. The depth data 110 may include a video sequence or a series of images, user inputs, and/or data from the operational systems 106, such as data from a Controller Area Network (CAN) bus including as pedal pressure, steer angle, etc. The depth data 110 may be received from the depth sensor 202. The depth sensor 202 may include radar units, lidar units, image capture components, sensors, cameras, scanners (e.g., 2-D scanners or 3-D scanners), or other measurement components. In some embodiments, the depth data 110 is augmented as additional sensor data from other sources. For example, the depth data 110 from the depth sensor 202 may be augmented by other sources, such as the image sensor 204, and/or remote devices (e.g., via the bus 108 and/or the communication interface 122).

The depth data 110 contains information relating to the distance of the surfaces of the object 208 from a viewpoint, such as the agent 200 or the depth sensor 202. The depth data 110 may include a map or cloud of per-pixel data containing depth-related information. The intensity of each pixel in the depth map is calculated based on a distance between the corresponding point from the point cloud of the RoI and the center frame of the force sensor 206. As shown in FIG. 2, the agent 200 is holding an object 208, shown here as a bottle, with a force sensor 206 represented by the hand of the agent 200. The density of the depth data received may be based on the depth sensor 202. Although shown as a single sensor, the depth sensor 202 may include a number of sensors. In some embodiments, the plurality of sensors may have operable connections that allow for communication via, for example, the network 132. The depth data 110 is received for at least the RoI of the object 208.

The depth map module 124 may additionally receive optical data 112 from an image sensor 204. The optical data 112 may include a video sequence or a series of images, user inputs, and/or data from the operational systems 106, such as data from a Controller Area Network (CAN) bus including as pedal pressure, steer angle, etc. The image sensor 204 may include radar units, lidar units, image capture components, ranging sensors, cameras, scanners (e.g., 2-D scanners or 3-D scanners), or other measurement components. The optical data 112 may include RGB data, YUV data, etc. The depth data 110 may form a visualized dataset 210 of the portion of the object 208 that may be visualized by the depth sensor 202. The visualized dataset 210 may be a color image corresponding to the depth data 110 visible by the depth sensor 202.

In some embodiments, the depth data 110 may be augmented with the optical data 112 and/or additional sensor data from other sources such as the depth sensor 202, and/or remote devices (e.g., via the bus 108 and/or the communication interface 122). In one embodiment, the depth data 110 may be received from with the Yale-CMU-Berkeley (YCB) Object and Model set.

For clarity, the method is described with respect to a single object 208. However, the depth data 110 and the optical data 112 may be associated with one or more objects. Accordingly, the agent 200 may detect or identify one or more of the entities, objects, obstacles, hazards, and/or corresponding attributes or characteristics, a position or a location associated with the object 208 as well as other objects.

At block 306, in the method 300, the depth map module 124 generates a depth map 212 for at least the RoI based on the depth data. The depth map 212 includes a threshold amount of information about the object 208. The threshold may be a value, not limited to, a numerical or other kind of value or level such as a percentage, a non-numerical value, a discrete state, a discrete value, a continuous value, among others. The depth map 212 is calculated from a volume of the depth data 110 relative to the RoI. For example, the depth data 110 is received as a point cloud of the RoI that is based on the tactile sensor size of a force sensor 206, such as a finger of the agent 200. If the depth data 110 satisfies the threshold, the depth map 212 is calculated from a volume of the point cloud relative to the finger's frame of reference. For example, the depth map 212 is generated based on a volume of space relative to the contact point, that is, relative to the point where the agent 202 is expected to make contact with the object 208. Accordingly, the depth map 212 may be an extracted point cloud patch.

The depth map module 124 may generate the depth map 212 differently based on whether the depth map module 124 is being trained or used in operation. For example, during training, a depth map 212 is calculated relative to the frame of reference of the force sensor 206. During training, the force sensor 206 is making contact with the object 208 at the RoI. During runtime, the force sensor 206 is not making contact with the RoI, which may be an arbitrary location relative to the object 208. Therefore, the depth map 212 is generated relative to a volume that includes all points in the RoI.

In another embodiment, suppose that the depth data 110 alone does not satisfy the threshold. The depth data 110 may be supplemented with data from other sources. For example, the depth data 110 may be supplemented with point clouds corresponding to the object 208 from optical data 112 and/or the YCB database. In one embodiment, the depth data 110 is combined with optical data, such as RGB data. In another embodiment, the point cloud may be registered with the depth data, for example, an iterative closest point technique may be used to register a YCB point cloud with the point cloud of the depth data 110 to form a denser registered point cloud that satisfies the threshold. Therefore, the threshold is satisfied without the need for the agent 200 making contact with the object 208 using the force sensor 206. Accordingly, the threshold is based on contactless sensor input from, for example, the depth sensor 202, the image sensor 204, and/or the other sources, such as a YCB dataset.

At block 308, the method 300 includes the estimation module 126 estimating an estimated tactile sensor output 214 based on the depth map 212. In some embodiments, the depth map 212 is an input to a network 216 of the estimation module 126. The network 216 utilizes machine learning techniques to estimate the tactile sensor output 214. The network 216 may be a Conditional Generative Adversarial Network (cGAN) to model the tactile sensor output 214. The network 216 may include a generator network, G, and a discriminator network, D. The generator generates the estimated tactile sensor output 214 based on the depth map 212. The discriminator is configured to determine whether a given input is observed or estimated. The network 216 is conditioned with an input, such as the estimated tactile sensor output 214 and/or the tactile data 114 until the discriminator may no longer distinguish between estimated and observed input.

Figure 4:
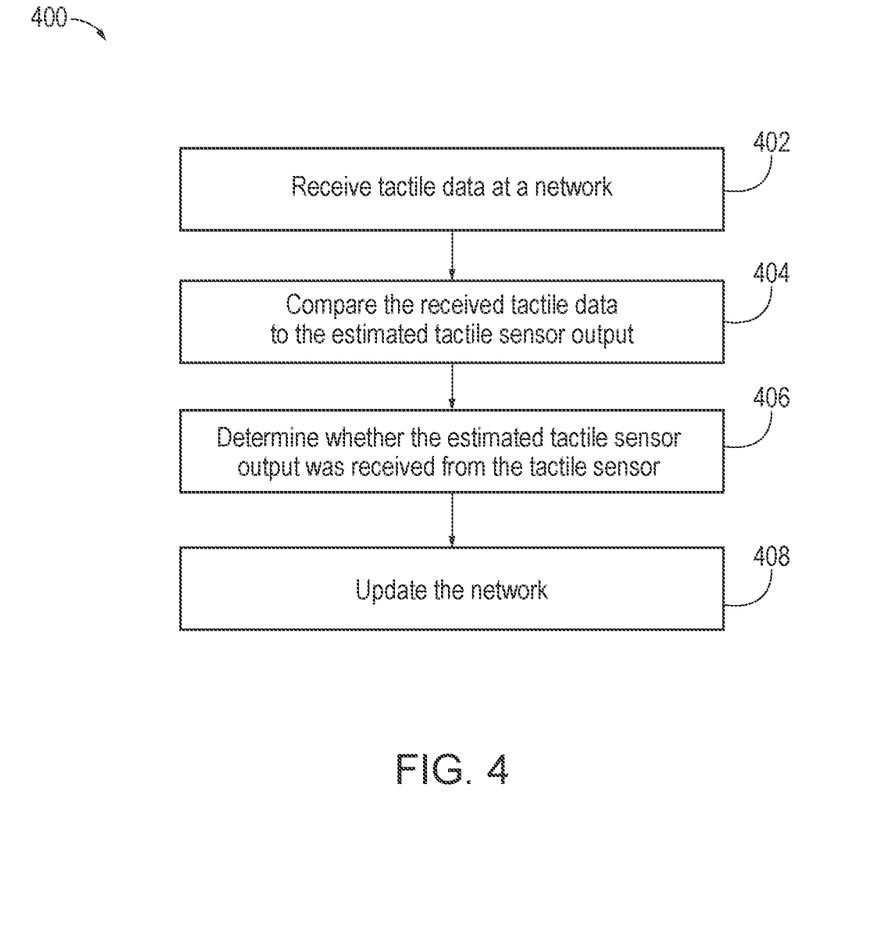
FIG. 4 is an exemplary process flow of a method for training a network for estimating tactile output based on depth data, according to one aspect.
Figure 5:
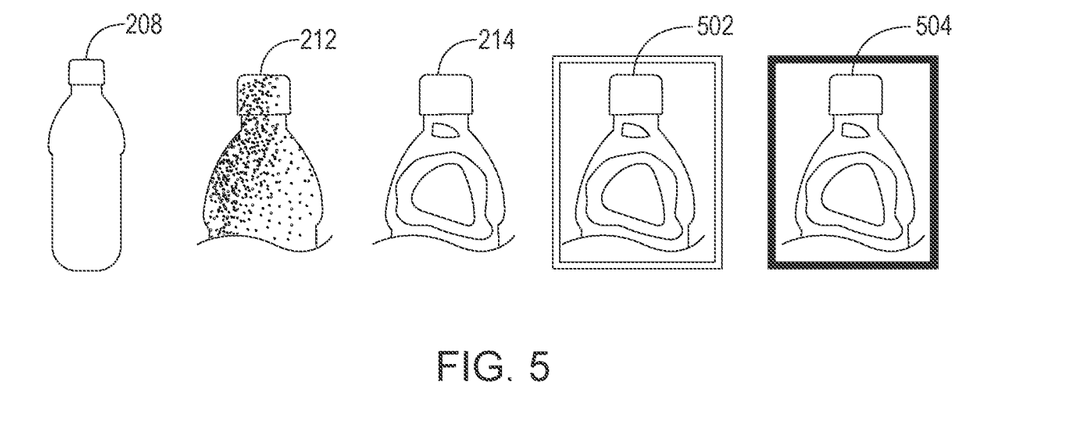
FIG. 5 includes exemplary image results for estimating tactile output based on depth data, according to one aspect.

Turning to FIG. 4 a method for training the network is provided. FIG. 4 will be described with reference to FIGS. 1-3 and 5-7. For simplicity, the method 400 will be described as a sequence of elements, but it is understood that the elements of the method 400 may be organized into different architectures, blocks, stages, and/or processes.

At block 402 the method 400 may include the network 216 that receives tactile data 114. The tactile data 114 may include pressure mapping, force mapping, user inputs, and/or data from the operational systems 106, such as data from a Controller Area Network (CAN) bus including as pedal pressure, steer angle, etc. In some embodiments, the sensor module 102 may receive the tactile data 114 as a contact-surface point cloud.

The tactile data 114 may be received from the force sensor 206. The force sensor 206 may include tensile force sensors, compressions force sensors, tensile and force compression sensors, or other measurement components. The force sensor 206 may be with a Weiss gripper with GelSight tactile sensors. In some embodiments, the tactile data 114 is augmented as additional sensor data from other sources is received. For example, the tactile data 114 from the force sensor 206 may be augmented by other sources, such as additional force sensors (e.g., from a second hand of the agent 200), and/or remote devices (e.g., via the bus 108 and/or the communication interface 122). The tactile data 114 may correspond to the RoI of the object 208 that is occluded by the agent 200 or the environment. The tactile data 114 may be received through a series of touches of the tactile sensor on or around the RoI on the object 208. In another embodiment, the agent 200 may make contact with the object at random location to collect tactile data 114. In some embodiments, the agent 200 may make contact with the object a predetermined number of times. For example, the agent may select a random location (x, y, z, θ) to sample the object surface. The random location (x, y, z) is calculated by adding a random value to the centriod of the object point cloud. The orientation, ex, ey may be fixed such that the palm of the force sensor 206 is parallel to the surface supporting the object 208. Accordingly, only ez of the tactile sensor may be changed. The contact force of the tactile sensor 206 may be set to a constant value. When the agent 200 makes contact with the object 208, a volume, (xc, yc, zc), of the point cloud at the contact location is extracted as tactile data 114. In some embodiments, the tactile data 114 may be received for each portion, such as for each finger, of the tactile sensor. The dimensions of the contact-volume are determined by the size of the surface of the tactile sensor, (xt, yt), and the depth of the surface elastomer (zt). In another embodiment, the agent may make contact with the object until a predetermined amount of tactile data 114 is received.

At block 404, the method 400 incudes the network 216 comparing the tactile data 114 observed by the agent 200 to the estimated tactile sensor output 214. The objective of the network 216 may be described as:

$$L_{cGAN}(G,D)=\varepsilon_{x,y}[\log D(x,y)]+\varepsilon_{x,z}[1-\log D(x, \log G(x,z))],\quad(1)$$

where G tries to minimize this objective against an adversarial D that tries to maximize it, for example:

$$G^* = \arg \min_G \max_D L_{cGAN}(G, D) \quad(2)$$

To encourage less blurring loss may be defined as:

$$L_{L1}=\varepsilon_{x,y,z}[\|y-G(x,z)\|_1]. \quad(3)$$

such that the objective of the network 216 may be mathematically given by:

$$G^*=arg \min_G, \max_D L_{cGAN}(G,D)+\lambda L_{L1}(G). \quad(4)$$

The generator may be based on an encoder-decoder with skip connections. The network 216 with skip connections may include connections in between each layer i and layer n-i, where n is the total number of layers. Skip connection concatenates information from layer i to layer n-i. This may facilitate shuttling low level information of an input from the encoder to the decoder.

At block 406, the method 400 includes determining whether the input is the estimated tactile sensor output 214 or tactile data 114 from the force sensor 206. In this manner, the discriminator of the network 216 may then output whether the given image is estimated or observed. For example, turning to FIG. 5, suppose that the ROI of the object 208 corresponds to an upper portion of the object 208 above the force sensor 206. Therefore, the depth map 212 of the object corresponds to the upper portion of the object 208. The estimated tactile sensor output 214 is estimated from the depth map in the manner described above with respect to FIG. 3. Therefore, the determination on whether the output is estimated or observed based on the objective of the network 216, given in Equation 4.

At block 408, the method 400 includes updating the network 216 based on whether the discriminator is able to differentiate between estimated tactile sensor output 214 and the tactile data 114. For example, the generator of the network 216 may change a parameter for estimating the estimated tactile sensor output 214 from the depth map 212 to generate an updated estimated tactile sensor output that may be sent to the discriminator of the network 216. The generator continues this process by averaging responses for different RoIs of the object. When the discriminator is unable to distinguish between the estimated tactile sensor output 214 and the tactile data 114, the generator of the network 216 has satisfactory parameters for estimating the tactile sensor output 214 based on the depth map 212, described by block 308 of the method 300. Therefore, the generator functions as the network 216 once the network has been trained, in the manner described with respect to FIG. 4.

Returning to FIG. 3, the method 300 continues to block 310. At block 310, the surface properties of the RoI are determined based on the estimated tactile sensory output without contact required to acquire the tactile data 114. Thereby, making it possible to account for the tactile sensor outputs without making a contact with the object 208 and select a suitable grasp location that reduces the need for re-grasping the object.

Figure 6:
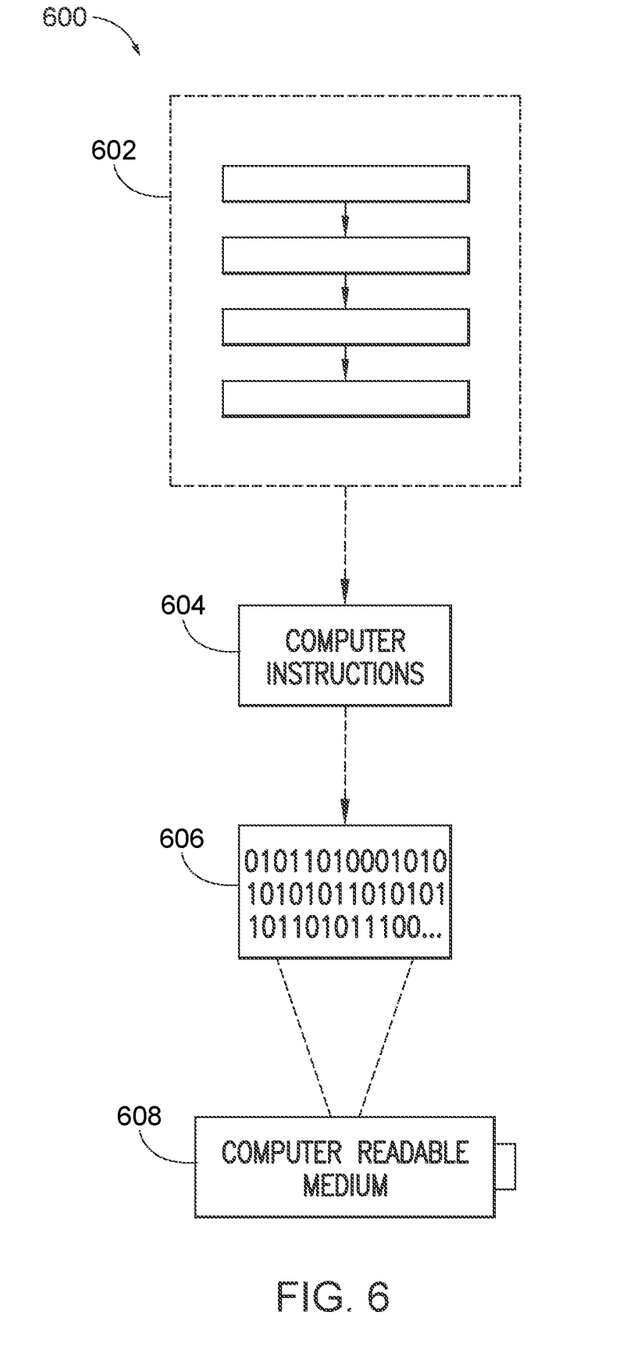
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3 and/or the method 400 of FIG. 4. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including an apparatus 712 configured to implement one aspect provided herein. In one configuration, the apparatus 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the apparatus 712 includes additional features or functionality. For example, the apparatus 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 712. Any such computer storage media is part of the apparatus 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 712 includes input device(s) 724 such as keyboard, mouse, pen, voice input device, touch input device, infrared cameras, video input devices, or any other input device. Output device(s) 722 such as one or more displays, speakers, printers, or any other output device may be included with the apparatus 712. Input device(s) 724 and output device(s) 722 may be connected to the apparatus 712 via a wired connection, wireless connection, or any combination thereof. In one aspect, an input device or an output device from another computing device may be used as input device(s) 724 or output device(s) 722 for the apparatus 712.

The apparatus 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for tactile output estimation, comprising:
a depth map module configured to:
identify a region of interest (RoI) of an object, wherein an area of the RoI corresponds to a tactile sensor size of a tactile sensor,
receive depth data for the RoI from a depth sensor, and
generate a depth map for the RoI based on a volume of the depth data relative to a frame of reference of the RoI;
an estimation module configured to estimate a tactile sensor output based on the depth map; and
a surface module configured to determine surface properties based on the estimated tactile sensor output,
wherein the estimation module is configured to be trained by inputting the depth map in a network having a discriminator and a generator,
wherein the discriminator is configured to receive tactile data and the estimated tactile sensor output and determine whether the estimated tactile sensor output was received from the tactile sensor.

2. The system of claim 1, wherein the RoI is identified based on optical data from an optical sensor.

3. The system of claim 1, further comprising a grasping module configured to identify a location on the object to grip based on the surface properties.

4. The system of claim 1, wherein the frame of reference is based on optical data, and wherein the depth data is registered with the optical data to form the depth map.

5. The system of claim 1, wherein the network is a conditional generative adversarial network.

6. A method for tactile output estimation, comprising:
   identifying a region of interest (RoI) of an object, wherein an area of the RoI corresponds to a tactile sensor size of a tactile sensor;
   receiving depth data for the RoI from a depth sensor;
   generating a depth map for the RoI based on a volume of the depth data relative to a frame of reference of the RoI;
   estimating a tactile sensor output based on the depth map; and
   determining surface properties based on the estimated tactile sensor output,
   wherein estimating the estimated tactile sensor output includes the depth map being input to a network to generate the estimated tactile sensor output,
   the method further comprising:
   receiving tactile data and the estimated tactile sensor output; and
   determining whether the estimated tactile sensor output was received from the tactile sensor.

7. The method of claim 6, wherein the RoI is identified based on optical data from an optical sensor.

8. The method of claim 6, wherein the frame of reference is based on optical data, and wherein the depth data is registered with the optical data to form the depth map.

9. The method of claim 6, the method further comprising identifying a location on the object to grip based on the surface properties.

10. The method of claim 9, wherein the frame of reference is based on optical data, and wherein the depth data is registered with the optical data to form the depth map.

11. A non-transitory computer readable storage medium storing instructions that when executed by a computer having a processor to perform a method for tactile output estimation, the method comprising:
   identify a region of interest (RoI) of an object, wherein an area of the RoI corresponds to a tactile sensor size of a tactile sensor;
   receive depth data for the RoI from a depth sensor;
   generate a depth map for the RoI based on a volume of the depth data relative to a frame of reference of the RoI;
   estimating a tactile sensor output based on the depth map; and
   determining surface properties based on the estimated tactile sensor output,
   wherein the frame of reference is based on optical data, and wherein the depth data is registered with the optical data to form the depth map,
   the method further comprising:
   receiving tactile data and the estimated tactile sensor output; and
   determining whether the estimated tactile sensor output was received from the tactile sensor.

12. The non-transitory computer readable storage medium of claim 11, wherein the RoI is identified based on optical data from an optical sensor.

13. The non-transitory computer readable storage medium of claim 11, wherein the frame of reference is based on optical data, and wherein the depth data is registered with the optical data to form the depth map.

14. The non-transitory computer readable storage medium of claim 11, the method further comprising identifying a location on the object to grip based on the surface properties.

* * * * *